(12) United States Patent
Rajabally

(10) Patent No.: US 7,974,933 B2
(45) Date of Patent: Jul. 5, 2011

(54) ESTIMATING THE EFFICACY OF A MATHEMATICAL MODEL OF SYSTEM BEHAVIOUR

(75) Inventor: Talib Eshan Rajabally, Loughborough (GB)

(73) Assignee: BAE Systems PLC, London (GB)

( * ) Notice: Subject to any disclaimer, the term of this patent is extended or adjusted under 35 U.S.C. 154(b) by 813 days.

(21) Appl. No.: 11/853,169

(22) Filed: Sep. 11, 2007

(65) Prior Publication Data

US 2009/0070279 A1 Mar. 12, 2009

(51) Int. Cl.
*G06N 5/00* (2006.01)
(52) U.S. Cl. ............................................ 706/12; 706/45
(58) Field of Classification Search .................... 706/12, 706/45
See application file for complete search history.

(56) References Cited

OTHER PUBLICATIONS

Chu, et al, Bayesian Support Vector Regression Using a Unified Loss Function, IEEE Transactions on Neural Networks, 2004, pp. 1-29.*
Rajbally, T. Eshen, M. Eng. Hons., "Evaluating the Efficacy of Mathematically Modelling the Behaviour of Engineered Systems," Thesis submitted for the degree of Doctor of Philosophy, Oct. 2005/Jul. 2006, University of Newcastle upon Tyne, Faculty of Science, Agriculture and Engineering, School of Marine Science and Technology,http://www-staff.lboro.ac.uk/~ouer/index.html.
Balci, Osman, "Validation, Verification, and Testing Techniques Throughout the Life Cycle of a Simulation Study," Proceedings of the 1994 Winter Simulation Conference, ed. J. D. Tew, S. Manivannan, D. A. Sadowski, and A. F. Seila, Lake Buena Vista, USA, 1994, pp. 215-220.
MacKenzie, Garth R., et al., "Verification Technology Potential with Different Modeling and Simulation Development and Implementation Paradigms," Proceedings of the Foundations for V&V (Validation and Verification) in the 21st Century Workshop, Session A1, Oct. 2002, pp. A1-1 to A1-43, Laurel, Maryland, USA.
Oberkampf, William L., et al., "A New Methodology for the Estimation of Total Uncertainty in Computational Simulation," Proceedings of the AIAA/ASME/ASCE/AHE/ASC Structures, Structural Dynamics, and Materials Conference and Exhibit, 1999, pp. 3061-3083, American Institute of Aeronautics and Astronautics AIAA-99-1612, St. Louis, MO., USA.
Druzdzel, Marek J., et al., "Building Probabilistic Networks: Where Do the Numbers Come From?," IEEE (Institute of Electrical and Electronics Engineers) Transactions on Knowledge and Data Engineering, Jul.-Aug. 2000, pp. 481-486, vol. 12, No. 4, IEEE Computer Society, Los Alamitos, CA, USA.

* cited by examiner

*Primary Examiner* — Wilbert L Starks, Jr.
(74) *Attorney, Agent, or Firm* — Buchanan Ingersoll & Rooney PC

(57) ABSTRACT

Estimating the overall efficacy of a mathematical model of system behavior involves providing a template representing factors that affect the overall efficacy of the mathematical model. A Bayesian Belief Network (BBN) having nodes based on the factors of the template is created and the BBN is used to obtain an estimate of the overall efficacy of the mathematical model of system behavior.

5 Claims, 6 Drawing Sheets

ESTIMATING THE EFFICACY OF A MATHEMATICAL MODEL OF SYSTEM BEHAVIOUR

FIELD OF THE INVENTION

The present invention relates to estimating the efficacy of a mathematical model of system behaviour.

BACKGROUND TO THE INVENTION

It is becoming increasingly commonplace to use models that simulate, or give an indication of, the behaviour of a system. A system can be considered generally as a collection of hardware, software, people, facilities, and procedures organized to accomplish some common objectives. A model can be thought of generally as a physical, mathematical, or otherwise logical representation of a system, entity, phenomenon, or process. The use of models is of particular importance in significant engineering projects, such as designing an aircraft, where the resources and risks involved are considerable. In such projects a mathematical model of an engineered system is normally used to provide a representation of the behaviour of the system, usually using computer-based modelling tools.

Unfortunately, the efficacy of system models is variable because it is determined by various factors. The difficulty of generating mathematical models has been well documented, see, for example, "Evaluating the Efficacy of Mathematically Modelling the Behaviour of Engineered Systems" Thesis submitted for the degree of Doctor of Philosophy, University of Newcastle upon Tyne, Faculty of Science, Agriculture and Engineering, 2006, currently available at http://www-staff.iboro.ac.uk/~ouer/, the contents of which are hereby incorporated by reference. As discussed in that thesis, the accuracy of mathematical models is variable and it is desirable to have an indication of the overall efficacy of a given systems model.

SUMMARY OF THE INVENTION

According to a first aspect of the present invention there is provided a method of estimating overall efficacy of a mathematical model of system behaviour, the method including:

providing a template representing factors that affect overall efficacy of a mathematical model of system behaviour;

creating a Bayesian Belief Network (BBN) having nodes based on the factors of the template;

using the BBN to obtain an estimate of overall efficacy of the mathematical model of system behaviour.

The factors may correspond to phases of a (known) systems modelling lifecycle. In one example the factors are selected from a set comprising: conceptualisation efficacy; mathematical modelling efficacy; discretisation efficacy; computerisation efficacy; parameterisation efficacy; numerical solution efficacy and results interpretation efficacy.

The method can include:

quantifying prior probabilities of root nodes of the BBN based on an estimated efficacy of a said factor represented by each said root node; and quantifying conditional probabilities of leaf nodes of the BBN based on an estimate of relative importance of a said factor represented by each said root node to the overall efficacy of the mathematical model of system behaviour or predecessor node, and performing Bayesian inference on the quantified Bayesian Belief Network in order to obtain an estimate of overall efficacy of the mathematical model of system behaviour.

The estimated efficacy and the estimate of relative importance of a said factor are normally based on at least one expert judgement. An indication of a said estimate may be obtained by eliciting maximum and minimum probabilities that bound a belief range of the expert. The estimate indication may be obtained using a graphical representation (e.g. number lines/ probability scales or a probability wheel/manipulable pie chart) of the belief range or discrete value.

Each said node of the BBN can be allocated two states representing "faultless" and "faulty" (or an equivalent indication that the node is without or with fault).

Numerical weights can be attached to parent nodes in the BBN to represent relative significance to a state of a common child node of the parent nodes so that a linear weighted deterministic expression can be used to equate the weights to conditional probabilities associated with the child nodes. The weights are normally derived from expert judgments regarding relative importance of the factors represented by the parent nodes to model efficacy or any predecessor leaf nodes.

The linear weighted deterministic expression can take the form:

$$P(b = x \mid a_i = x) = P(b = x \mid a_i = y) + (P_{max} - P_{min}) \cdot W_{ai} \Big/ \sum_{i=1}^{n} W_{ai}$$

where binary child node b with states x and y has n binary parent nodes $a_1, a_2, a_3, \ldots, a_n$, also with states x and y; weights $W_{a1}, W_{a2}, W_{a3}, \ldots, W_{an}$ ($W_{ai} \in +R$) are attached to the parent nodes representing their relative importance to the state of b; and $P_{max} \geq P_{min}$ which together bound a range of possible probabilities of b=x; such that the expression provides $2^n-2$ of $2^{n+1}$ required conditional probabilities which relate b with $a_1, a_2, a_3, \ldots, a_n$.

A task of determining the conditional probabilities for use in quantifying the child nodes of the BBN can be reduced by assuming that model efficacy is totally without fault if all of the factors are totally without fault and by assuming that model efficacy is totally faulty if all of the factors are totally faulty. The assumptions can be expressed as follows:

$$P(b=\text{faultless} \mid a_1,a_2,a_3,a_4,a_5,a_6,a_7=\text{faultless})=1$$

$$P(b=\text{faultless} \mid a_1,a_2,a_3,a_4,a_5,a_6,a_7=\text{faulty})=0$$

where b=model efficacy, $a_1$=conceptualisation efficacy, $a_2$=mathematical modelling efficacy, $a_3$=discretisation efficacy, $a_4$=computerisation efficacy, $a_5$=parameterisation efficacy, $a_6$=numerical solution efficacy, $a_7$=results interpretation efficacy.

The method may further include decomposing any said root node of the BBN into at least one further BBN having nodes representing contributing factors that affect the efficacy of the root node. The method may further include quantifying the at least one further BBN and performing Bayesian inference on the quantified further BBN to obtain an estimate of the efficacy of the said root node.

According to another aspect of the present invention there is provided apparatus adapted to estimate overall efficacy of a mathematical model of system behaviour, the apparatus including:

a device for providing a template representing factors that affect overall efficacy of a mathematical model of system behaviour;

a device for creating a Bayesian Belief Network (BBN) having nodes based on the factors of the template;

a device for using the BBN to obtain an estimate of overall efficacy of the mathematical model of system behaviour.

According to another aspect of the present invention there is provided a computer program product comprising computer readable medium, having thereon computer program code means, when the program code is loaded, to make the computer execute a method of estimating overall efficacy of a mathematical model of system behaviour substantially as described herein.

According to another aspect of the present invention there is provided a method of creating a Bayesian Belief Network (BBN) adapted to estimate efficacy of a mathematical model of system behaviour, the method comprising providing a template representing factors that affect overall efficacy of a mathematical model of system behaviour and creating a BBN having nodes based on the factors of the template. According to yet another aspect of the present invention there is provided a method of creating a template for creating a Bayesian Belief Network (BBN), the method including selecting phases of a design lifecycle that affect overall efficacy of a mathematical model of system behaviour, and creating a template where the selected phases correspond to nodes for use in a BBN configured to estimate the overall efficacy of the mathematical model. The method may further include creating a further template for a said selected phase, the further template including at least one node that corresponds to at least one respective factor that determines overall efficacy of the selected phase.

According to another aspect of the present invention there is provided data representing a Bayesian Belief Network (BBN) substantially as described herein. According to yet another aspect of the invention there is provided a template, or electronic data representing a template, adapted to create a BBN useable in estimating efficacy of a mathematical model of system behaviour.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawings in which.

DETAILED DESCRIPTION

Figure 1:
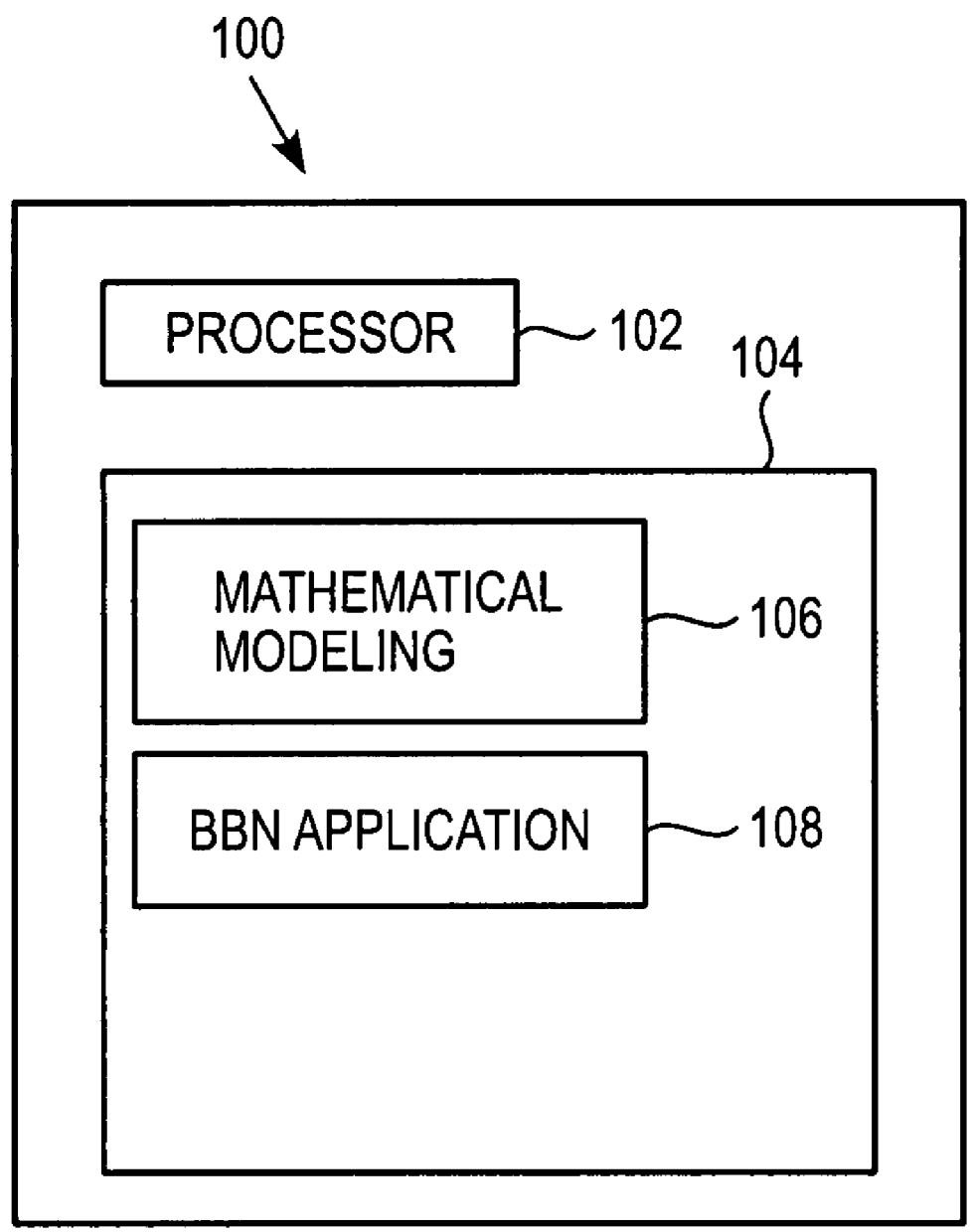
FIG. 1 is a schematic representation of a computer that can be used to assist with implementing an embodiment of the method.

Referring to FIG. 1, there is shown a computing device 100 including a processor 102 and internal memory 104. The computing device can comprise a personal computer or the like and will include conventional interface and communications devices, e.g. a display, keyboard, wire-based/wireless communications means, etc. The computing device may also include a further storage device, such as a hard drive. The internal Random Access Memory of the computing device includes software 106 comprising a mathematical modelling application and software 108 comprising a Bayesian Belief Network (BBN) application. It will be understood that the set up of FIG. 1 is exemplary only and variations are possible, e.g. the software 106 may be located on a separate computing device that stores mathematical modelling data that is then loaded onto the computing device 100.

Figure 2:
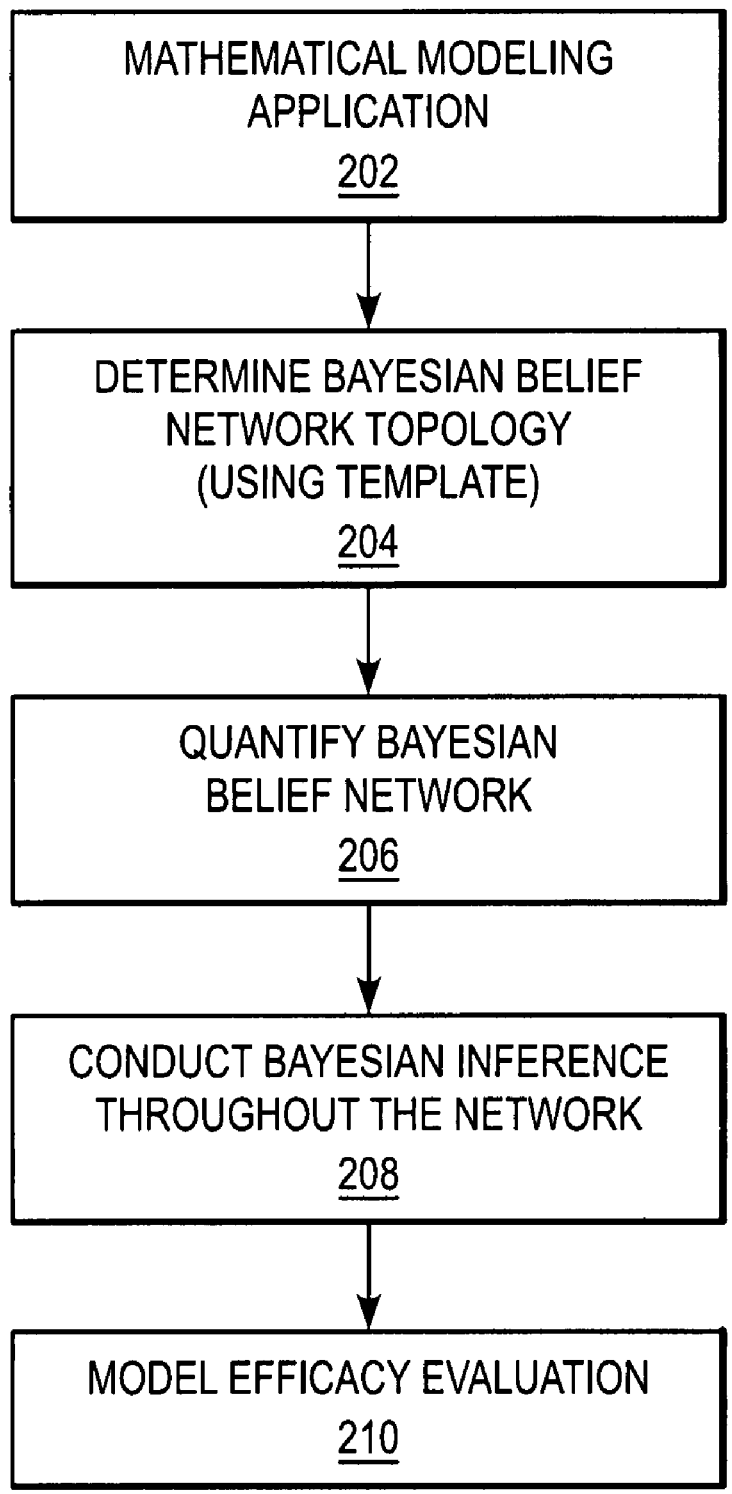
FIG. 2 is a flowchart illustrating steps performed during the method.

Turning to FIG. 2, there is shown examples of steps involved in executing an embodiment of the invention on the computing device 100. At step 202 a mathematical model for an application is generated. This can involve use of a known software application such as Matlab by The Mathworks, Inc of Natick, Mass., USA and Mathematica by Wolfram Research, Inc of Champaign, Ill., USA, although the skilled person will also understand that the mathematical modelling does not have to be software-implemented.

At step 204 the topology of a BBN is created using a template describing a plurality of contributing factors that determine the overall efficacy of the mathematical model. Generic knowledge about the domain of the system to be modelled can be represented by a fixed belief network over a fixed set of variables. A user following the method described herein can create a template that can then be used as the basis for a BBN. Bayesian Belief Networks have not previously been used to capture judgements on the efficacy of systems modelling.

Although a Bayesian Belief Network may be "learnt" from data, building a network in the absence of such data generally involves three tasks. The first is to identify the variables that are of importance to the particular problem along with their possible values. As will be described below, in the case of the method described herein, the variables represent factors that affect the overall efficacy of the model of the system. The variables provide the nodes of the BBN and the variable values provide the node states.

The second task is to identify the relationships between these variables and to express these as a Directed Acyclic Graph. This task is also known as specifying the Bayesian Belief Network topology and requires appropriate nodes of the Bayesian Belief Network to be connected with arcs. The final task is to obtain the probabilities that are required to quantify the Bayesian Belief Network and populate all prior and conditional probability tables. Once the three tasks, are completed, Bayes' theorem may be used to conduct probabilistic inference within the Bayesian Belief Network and reasoning about the problem may then be performed.

The skilled person will appreciate that a template for the purpose of constructing a model efficacy BBN can take various forms. Many different methods of producing models of a system undergo common phases. Balci, O., 1994, "Validation, Verification, and Testing Techniques Throughout the Life Cycle of a Simulation Study", Proceedings of the 1994 Winter Simulation Conference, Lake Buena Vista, USA, pp. 215-220 (the contents of which are hereby incorporated by reference), and MacKenzie, G. R., Schulmeyer, G. G., Yilmaz, L., 2002, "Verification Technology Potential with Different Modeling and Simulation Development and Implementation Paradigms", Proceedings of the Foundations for V&V (Validation and Verification) in the 21st Century Workshop, Session A1, Maryland, USA, A1-1 to A1-40 (the contents of which are hereby incorporated by reference), include discussions of such common steps. The example described below is based on the phases of modelling proposed in Oberkampf, W. L., DeLand, S. M., Utherford, B. M., Diegert, K. V., and Alvin, K. F., 1999, "A New Methodology for the Estimation of Total Uncertainty in Computational Simulation", Proceedings of the AIAA/ASME/ASCE/AHS/ASC Structures, Structural Dynamics, and Materials Conference and Exhibit, St. Louis, USA, American Institute of Aeronautics and Astronautics AIAA-99-1612, pp. 3061-3083 (the contents of which are hereby incorporated by reference); however, the skilled person will recognise that the method can be adapted to use templates based on other phases. The Oberkampf methodology involves seven phases of modelling (referred to herein as the "Oberkampf model phases") that can be summarised as follows:

Phase 1: Physical system (existing or proposed)
Phase 2: Conceptual modelling of the physical system
Phase 3: Mathematical modelling of the conceptual system
Phase 4: Discretisation and algorithm selection for the mathematical model
Phase 5: Computer programming of the discrete model
Phase 6: Numerical solution of the computer program model, and
Phase 7: Representation of the numerical solution An overview of these phases will now be given. The conceptual modelling phase (2) of the physical system involves developing a specification of the physical system of interest and the environment, which it inhabits. In essence, a boundary must be placed around the system of interest. Those factors that influence the system, but fall outside this boundary, are considered as part of the environment and are therefore neglected in the model. Hence, the proposed distinction is that a system may be influenced by the environment, but the environment cannot be influenced by the system. Conceptual modelling involves determining which physical events, or sequence of events and which types of coupling of different physical processes will be considered. Stated differently, conceptual modelling involves determining the real world aspects to be omitted from the model. A conceptual model may be interpreted as any collection of specification statements relevant to the same problem, or as the translation of modelling requirements into a detailed design framework.

The mathematical modelling phase (3) involves the development of precise analytical statements of the problem to be solved. This can include the specification of all relevant fundamental equations, auxiliary equations, boundary conditions and initial conditions that describe the conceptual model. The distinction between fundamental and auxiliary equations is best explained by an example. The fundamental equations concerning a fluid dynamics problem would be the conservation statements for mass, momentum and energy whilst the auxiliary equations would be the turbulence modelling expressions required to complete the model. The boundary and initial conditions provide the closure expressions for the model.

The discretisation phase (4) involves translating the mathematics from a calculus problem to an arithmetic problem. For instance, partial differential equations are converted into a discrete or numerical form. Discretisation error is the difference between the exact solution of partial differential equations and their discretised equivalents.

The computerisation phase (5) of the discrete model is followed by the numerical solution (6) of the computerised model. Computerisation may range from a simple spreadsheet calculation to implementation within bespoke or commercial software. During this phase, errors can occur in input and output data files, source-code programming, compilers and operating systems. Numerical simulations of continuum problems are inherently inaccurate, due to the requirement for discrete approximations.

The final phase of modelling is the representation and interpretation of the numerical solution (7). This may be subject to uncertainty and error if, for example, complex visualisation is required or if the solution requires interpolating or extrapolating.

Figure 3:
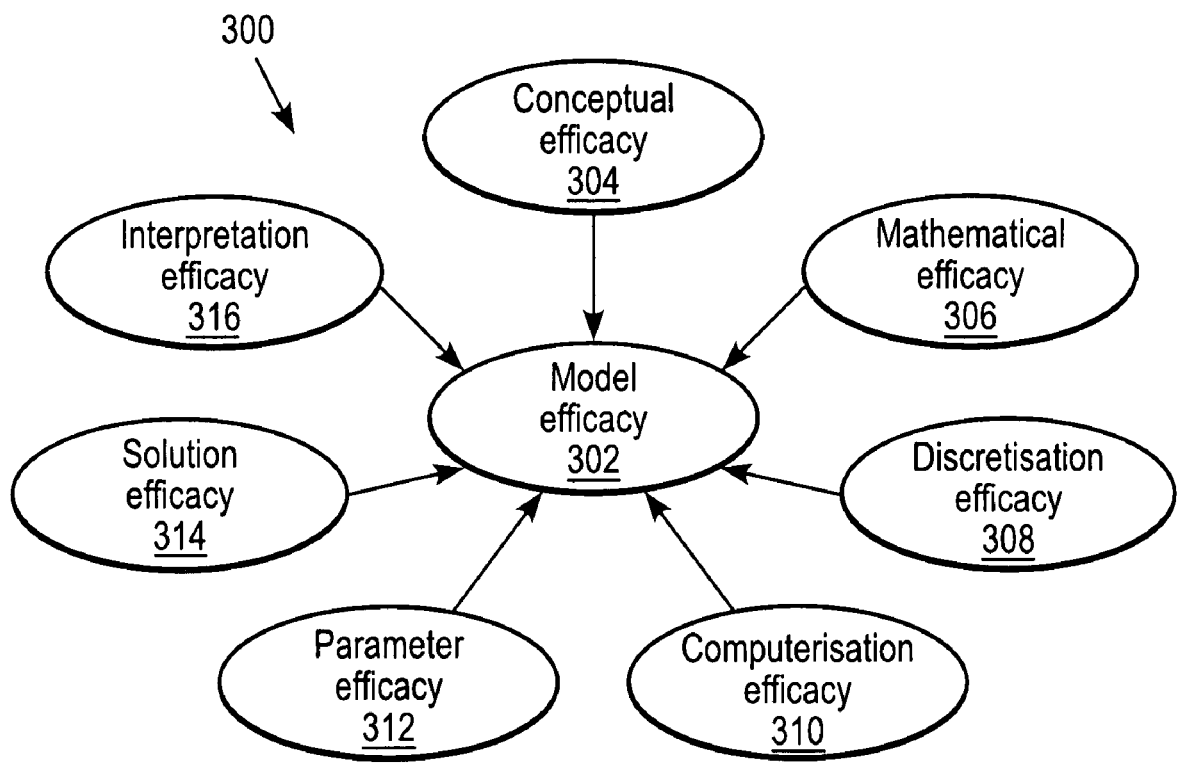
FIG. 3 is a schematic representation of a template used in the method.

FIG. 3 illustrates schematically an example template that can be used at step 204 for forming the basis of the topology of the BBN. Although the template 300 shown in FIG. 3 is based on the widely-applicable Oberkampf model phases, it will be understood that other systems modelling phases, such as ones discussed in the Balci and MacKenzie et al references above, could be used as the basis for the template. It will also be noted that not all of the nodes of the template 300 correspond precisely to the seven Oberkampf phases set out above. Further, alternative phases could be substituted for those depicted, according to the preferences of a user of the approach. The template can be constructed/provided using a software application for displaying and editing a graphical representation of the template, or simply in the form of printed instructions or the like. In some cases, the template may initially take the form of an incomplete BBN that can be created/loaded into BBN manipulation software, such as Netica™ by Norsys Software Corporation of Vancouver, Canada.

The central node 302 of the template 300 represents overall efficacy of the model. The overall efficacy of systems modelling can be considered to be a combination of the efficacy of its phases. Connected to the central node are seven root nodes that represent factors that determine the overall efficacy of the model. The root nodes in the example comprise: conceptualisation efficacy 304, mathematical modelling efficacy 306, discretisation efficacy 308, computerisation efficacy 310, parameterisation efficacy 312, numerical solution efficacy 314 and results interpretation efficacy 316.

In addition to representing sequential stages in the modelling lifecycle, there are further reasons for this choice of nodes made by the inventor. First, sources of model uncertainty and error that serve to reduce model efficacy may be attributed to the phases represented by these nodes. Second, as generic phases of mathematical modelling, the nodes are of widespread applicability. They therefore allow for a standardised approach to efficacy evaluation and they enable models to be compared on a level footing. For instances in which phases are not relevant to a particular modelling application, the relevant nodes may simply be excluded from consideration. For example, the BBN for a simple algebraic model that can be solved by hand calculation would not require the computerisation efficacy node. Also, the decomposition of an efficacy evaluation into assessments of individual modelling phases is important for the capture and sharing of model understanding. Thus, the user can select which of the seven root nodes are appropriate for the system model under consideration and use these as the basis of a BBN topology for estimating the overall efficacy of the model under consideration. This selection can involve the user using his own specialised knowledge, or using at least one expert's opinion.

Thus, the template 300 is only one example of a template for an efficacy evaluation and the skilled person will be able to use further/alternative nodes and arcs to best capture their modelling application.

A BBN constructed from the template 300 may be classified as "Naïve" or "Idiot's" Bayes applications, where, although Bayesian theory and practice still governs, the effect of a variable value on the outcome variable of interest is assumed to be conditionally independent of the values of other variables. The remaining elements to model efficacy evaluation not included in the BBN constructed are still relevant if the user assumes conditional dependence both between phases of modelling and between any subsequent expansions of nodes representing these phases.

The reader may notice that the parameterisation efficacy node 312 does not appear as a phase in the work of Oberkampf outlined above. However, its inclusion as a distinct node is important for two reasons. First, the numerical solution of a mathematical model cannot be conducted in the absence of numerical data for parameter values. Second, model parameterisation is a well-known source of uncertainty and error.

By decomposing modelling into the successive subtasks represented by the nodes shown in FIG. 3, the BBN topology rigorously and systematically addresses substantially all aspects of model efficacy. As this topology can be applied as a template to a diversity of systems models, it thus provides a formal method of efficacy evaluation. The state of each of the root nodes in FIG. 3 can be themselves the result of disparate and uncertain factors. Hence, each root node may be expanded into at least one further BBN.

Figure 4A:
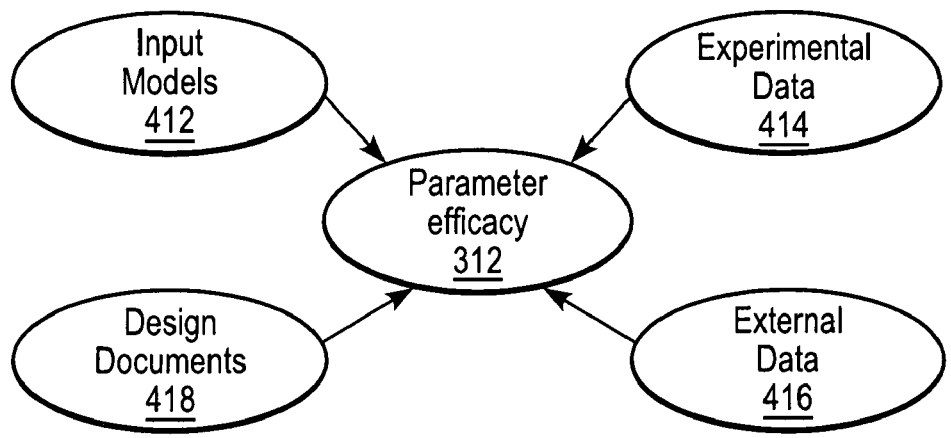
FIGS. 4A and 4B are schematic representations of further templates.

An example expansion of the "parameter efficacy" node 312 is shown in FIG. 4A. Parameterisation efficacy may be considered as the synthesis of the quality of input models, experimental data, external data and design documents. In other words, the user implementing the efficacy estimation method on the example template 300 has determined that the parameter efficacy (which, in turn, is a factor in determining the overall model efficacy represented by node 302) is dependent upon factors based on the accuracy of input models, experimental data, external data and design documents relating to the parameter values obtained. The terminal node 312 is therefore shown in FIG. 4A as being connected to four root nodes, namely input model node 412, experimental data node 414, external data node 416 and design documents node 418.

Figure 4B:
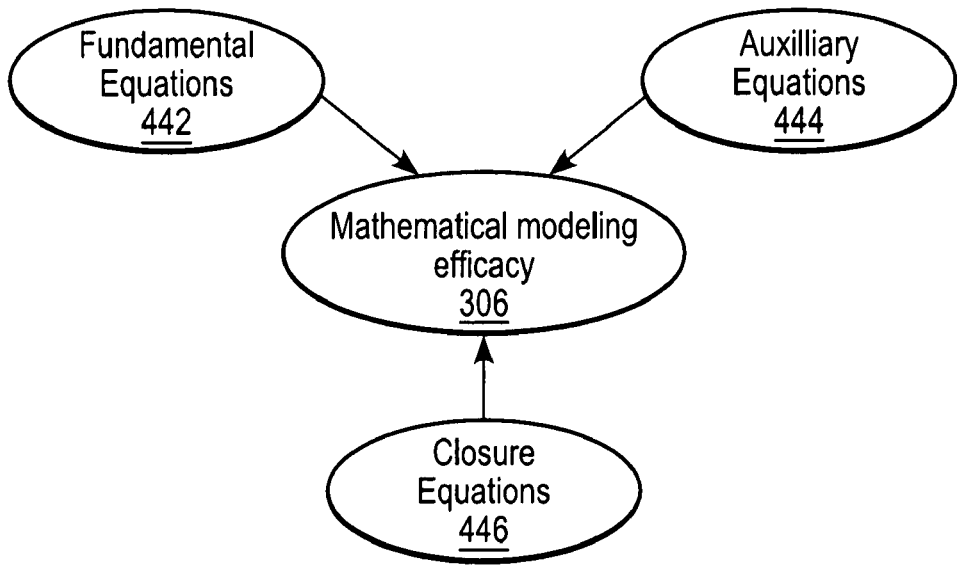

The skilled person will understand that further BBNs for the other root nodes of FIG. 3 can be created in a similar manner. For example, FIG. 4B shows an expansion of the "mathematical efficacy" node 306. The terminal node 306 is shown as being connected to three root nodes, namely fundamental equations node 442, auxiliary equations node 444 and closure equations node 416 because the accuracy of all of these factors will determine the efficacy of the mathematical model phase of the overall model.

Having determined the nodes of the BBN for reasoning about model efficacy as discussed above, states can be allocated to each of the nodes. The inventor has determined that the use of the two states, "faultless" and "faulty", is advantageous. A first reason for this is that the concept of modelling phase efficacy is relatively abstract in nature and not amenable to multiple value levels. Second, under the unmanageable burden of numerous, complex and inestimable sources of model uncertainty and error, simple qualitative distinctions may be intuitively favoured by engineers in model evaluation. Thirdly, it is desirable to keep the number of node states to a minimum, in order to reduce the task of judgement elicitation that is required to quantify the BBN. Although the use of twin node states has these advantages, the number of node states can be varied according to the preferences of a user of the approach and the specific circumstances of the model. Furthermore, quantitative evidence may be combined with qualitative judgements. For instance, the node "computerisation efficacy" could be configured as a function of software quality assurance measures.

At step 206 the BBN created at step 204 is quantified. For the Bayesian Belief Network developed to reason about model efficacy, the task of eliciting prior probabilities is kept to a minimum with the adoption of two node states, as described above, for any of the root nodes 304-316 selected for inclusion in the BBN. Prior probabilities will now be explained using a simple example. Suppose an aircraft has failed to complete the mission of flying a given distance under non-hostile conditions. An engineer suspects only two causes: a) that insufficient fuel has been provided and/or b) that a fault has occurred in the aircraft's systems. Assuming that these events are conditionally independent, this information may be represented by a Bayesian Belief Network. It is further assumed that these events have only two possible states of true and false and their nodes may therefore be referred to as both Boolean and binary.

Now, suppose the engineer is confident that the correct quantity of fuel was provided but can recall similar aircraft that have not flown fault-free missions so that $P(a_2=True)>P(a_1=True)$. This could be expressed as numerical beliefs known as prior probabilities in the following probability table:

|  | True | False |
| --- | --- | --- |
| $P(a_1)$ | 0.10 | 0.90 |
| $P(a_2)$ | 0.40 | 0.60 |

It is sensible to assume that the probability of mission failure is highest if there has been both insufficient fuel and an aircraft fault. Conversely, if neither has occurred, then the probability of mission failure will be lowest. Furthermore, the engineer believes that although a lack of fuel is likely to lead to mission failure, not all aircraft faults necessarily would (i.e. $P(b=True|a_1=True, a_2=False)>P(b=True|a_1=False, a_2=True)$). This may be expressed as posterior probabilities in the following probability table:

|  | $a_1$ = True | | $a_1$ = False | |
| --- | --- | --- | --- | --- |
|  | $a_2$ = True | $a_2$ = False | $a_2$ = True | $a_2$ = False |
| $P(b = True)$ | 0.90 | 0.75 | 0.60 | 0.10 |
| $P(b = False)$ | 0.10 | 0.25 | 0.40 | 0.90 |

Based upon the above two probability tables, Bayes' theorem can be used, as follows for example, to calculate the posterior probability that an aircraft fault has occurred given the event that the aircraft failed to complete the mission. The conclusive observation of such an event provides "hard" evidence to the Bayesian Belief Network although the influence of adjustments to prior probabilities (i.e. "soft" evidence) may be similarly computed:

$P(a_2 = \text{True} \mid b = \text{True}) =$ $$\frac{P(a_2 = \text{True}) \cdot P(b = \text{True} \mid a_2 = \text{True})}{\sum P(b = \text{True over all combination of states of } a_1 \text{ and } a_2)}$$

From prior probability table above, $P(a_2 = \text{True}) = 0.40$ and, $\sum P(b = \text{True over all} =$ combination of states of $a_1$ and $a_2$) $= P(a_1 = \text{True}) \cdot P(a_2 = \text{True}) \cdot$ $P(b = \text{True} \mid a_1 = \text{True}, a_2 = \text{True}) +$ $P(a_1 = \text{True}) \cdot P(a_2 = \text{False}) \cdot$ $P(b = \text{True} \mid a_1 = \text{True}, a_2 = \text{False}) +$ $P(a_1 = \text{False}) \cdot P(a_2 = \text{True}) \cdot$ $P(b = \text{True} \mid a_1 = \text{False}, a_2 = \text{True}) +$ $P(a_1 = \text{False}) \cdot P(a_2 = \text{False}) \cdot$ $P(b = \text{True} \mid a_1 = \text{False}, a_2 = \text{False})$ $= 0.10(0.40)(0.90) + 0.10(0.60)(0.75) +$ $= 0.90(0.40)(0.60) + 0.90(0.60)(0.10)0.35$ $P(b = \text{True} \mid a_2 = \text{True}) = P(b = \text{True} \mid a_2 = \text{True}, a_1 = \text{True}) \cdot$ $P(a_1 = \text{True}) + P(b = \text{True} \mid a_2 =$ $\text{True}, a_1 = \text{False}) \cdot P(a_1 = \text{False})$ $= 0.90(0.10) + 0.60(0.90)$ $= 0.63$ Finally, the probability that an aircraft fault has occurred given that the aircraft failed to complete the mission, $P(a_2 = \text{True} \mid b = \text{True}) = 0.63(0.40)/0.35$ $= 0.72$ Prior probabilities are required for all root nodes in any Bayesian Belief Network. Given the additivity assumption of probability theory, the adopted node states for the example nodes in FIG. 3 are not only mutually exclusive but they are also exhaustive in nature. As a result, only one numerical value is required to define the prior probabilities for each of the root nodes as P(faulty)+P(faultless)=1. This value, in Bayesian terms, is expert belief in the extent to which the modelling phase represented by the node is with or without fault.

For successful probability elicitation, the uncertain quantities of interest should be unambiguously defined. This should be such that a perfect clairvoyant (i.e. someone with absolute knowledge of the future and therefore fictitious) would be able to specify the exact numerical value of the uncertain quantity without the need to ask further questions. As a result, traditional means of probability elicitation (e.g. odds ratio) assume that expert belief corresponds to the frequentist notion of probability. The frequentist interpretation of the required numerical value for each node is the fraction of the number of similar past model applications in which the respective modelling phase has been observed to be with or without fault. Conversely, the Bayesian interpretation of the required value is a degree of belief derived only from personal knowledge of the underlying phenomena such as sources of faults and their severity. The providers of the numerical values for the Bayesian Belief Network developed to reason about model efficacy, may choose their preferred interpretation: Bayesian or frequentist. As such, the approach to model efficacy evaluation described herein caters both for users who express their beliefs as objective measures and for those who adopt subjective judgments.

Conditional probabilities also need to be determined. As background for these types of probabilities, diagnosis is a type of Bayesian inference also known as abduction and bottom-up reasoning where the analysis is from effect to cause. Bayes' theorem also permits analysis from cause to effect and thus enables top-down reasoning and predictive, causal or generative inference. A further form of inference sometimes termed as intercausal, gives rise to a fundamental phenomenon of Bayesian Belief Networks known as explaining away, selection bias or Berkson's paradox. For example, returning to the Bayesian Belief Network application given in the simple example above, it can be shown that $P(a_1=\text{True}|b=\text{True}, a_2=\text{True}) < P(a_1=\text{True}|b=\text{True})$ and that $P(a_2=\text{True}|b=\text{True}, a_1=\text{True}) < P(a_2=\text{True}|b=\text{True})$. Despite the fact that the occurrence of aircraft fault and insufficient fuel are assumed to be independent events, they become conditionally dependent once the outcome of the mission is known. If the mission fails and the occurrence of one of its causes is known for certain, then the posterior probability of the other cause is said to be "explained away" and is therefore reduced. Bayesian Belief Networks elucidate the occurrence of a further significant statistical paradox known as Simpson's paradox. This paradox essentially means that a statistical relationship between two variables may be reversed, by including additional factors in the analysis.

Conditional probabilities are required for all non-root nodes in any Bayesian Belief Network. For Bayesian Belief Network applications in which the conditional dependencies between variables are difficult to define accurately, "qualitative influences" may be of assistance. A qualitative influence is a symmetric property describing the sign of probabilistic interaction between node states.

An example four node BBN will now be used to demonstrate such influences. The four node Bayesian Belief Network has binary parents $a_1$, $a_2$ and $a_3$ with states x and y, and a binary child b also with states x and y. A positive qualitative influence from $a_1=x$ to $b=x$ expresses that choosing a higher value for the belief or probability that $a_1=x$ makes $b=x$ more likely (i.e. P(b=x) increases) regardless of the values of the other node states. This influence is symmetric as, by analogy, choosing a lower value for the belief or probability that $a_1=x$ makes $b=x$ less likely (i.e. P(b=x) decreases) regardless of the values of the other node states. A negative qualitative influence from $a_1=x$ to $b=x$ expresses that choosing a higher value for the belief or probability that $a_1=x$ makes $b=x$ less likely (i.e. P(b=x) decreases) regardless of the values of the other node states. Here, by symmetry, choosing a lower value for the belief or probability that $a_1=x$ makes $b=x$ more likely (i.e. P(b=x) increases) regardless of the values of the other node states. Such qualitative information can be expressed in a canonical form consisting of (in)equalities imposing constraints on the hyperspace of possible joint probability distributions. If experts can specify qualitative influences between variables, then canonical inequalities can be used to indicate subsequent probabilities that are not compatible with these influences and are therefore subject to error. For instance, concerning the example four node Bayesian Belief Network, a positive qualitative influence from $a_1=x$ to $b=x$ gives rise to the following probabilistic inequalities:

$$P(b=x|a_1=x,a_2=x,a_3=x) \geq P(b=x|a_1=y,a_2=x,a_3=x)$$

$$P(b=x|a_1=x,a_2=y,a_3=x) \geq P(b=x|a_1=y,a_2=y,a_3=x)$$

$$P(b=x|a_1=x,a_2=x,a_3=y) \geq P(b=x|a_1=y,a_2=x,a_3=y)$$

$$P(b=x|a_1=x,a_2=y,a_3=y) \geq P(b=x|a_1=y,a_2=y,a_3=y)$$

Furthermore, if the conditional probabilities for the four node Bayesian Belief Network are denoted as unknowns $z_1$, $z_2, \ldots, z_{16}$ in the table below, (e.g. $P[b=x|a_1=x, a_2=x, a_3=x] = z_1$) then the first inequality equates to the following canonical form:

$$P(b=x|a_1=x,a_2=x,a_3=x) \geq P(b=x|a_1=y,a_2=x, a_3=x) \Longrightarrow z_1 \geq z_5$$

and the remaining inequalities translate to the following:

$$z_3 \geq z_7, z_2 \geq z_6, z_4 \geq z_8$$

| State of $a_1$ | x | | | | y | | | |
|---|---|---|---|---|---|---|---|---|
| State of $a_2$ | x | | y | | x | | y | |
| State of $a_3$ | x | y | x | y | x | y | x | y |
| State x of b | $z_1$ | $z_2$ | $z_3$ | $z_4$ | $z_5$ | $z_6$ | $z_7$ | $z_8$ |
| State y of b | $z_9$ | $z_{10}$ | $z_{11}$ | $z_{12}$ | $z_{13}$ | $z_{14}$ | $z_{15}$ | $z_{16}$ |

Now, it may similarly be shown that a positive qualitative influence from $a_2=x$ to $b=x$ translates to the canonical form:

$$z_1 \geq z_3, z_2 \geq z_4, z_5 \geq z_7, z_6 \geq z_8$$

and likewise for a positive qualitative influence from $a_3=x$ to $b=x$:

$$z_1 \geq z_2, z_3 \geq z_4, z_5 \geq z_6, z_7 \geq z_8$$

Such canonical inequalities could be employed in a software tool to check the consistency of Bayesian Belief Network conditional probabilities entered by hand and thus ease Bayesian Belief Network quantification. If experts can specify qualitative influences between variables, then canonical inequalities can be used to ensure that subsequent probabilities elicited are compatible with these influences. However, in using qualitative influences, it must be ensured that the relationship between a parent node and a child node is maintained for all combinations of states of all other parent nodes (i.e. regardless of how the other parent nodes vary).

The quantification of Bayesian Belief Networks may be semi-automated by employing statistical distributions or deterministic expressions, as described in Druzdzel, M. J., and van der Gaag, L. C., 2000, "Building Probabilistic Networks: Where Do the Numbers Come From?", IEEE (Institute of Electrical and Electronics Engineers) Transactions on Knowledge and Data Engineering, Vol. 12, No. 4, pp. 481-486. In either case, the required probabilities are derived from highly limited information provided by the user. The burden of judgement elicitation on participating experts is thereby greatly reduced and this also reduces the scope for quantification errors. If numerical weights can be attached to parent nodes to represent their relative significance to the state of their common child node, then a simple expression is now proposed to equate these weights to conditional probabilities. Assume a binary child node b with states x and y has n binary parent nodes $a_1, a_2, a_3.$, an also with states x and y. Suppose weights $W_{a1}, W_{a2}, W_{a3}, \ldots, W_{an}$ ($W_{ai} \in +R$) can be attached to the parent nodes representing their relative importance to the state of b.

Now if:

$$P(b=x|a_1=x,a_2=x,a_3=x, \ldots, a_n=x) = P_{max} \quad (1)$$

$$P(b=x|a_1=y,a_2=y,a_2=y, \ldots, a_n=y) = P_{min} \quad (2)$$

where $P_{max} \geq P_{min}$ and together these provide the bound to the range of possible probabilities of $b=x$, the assumption is therefore made that a positive qualitative influence, as described in the previous paragraph, exists from $a_i=x$ to $b=x$ (for all $i=1$ to n). Now if all other parent nodes are in a fixed state let:

$$P(b=x|a_i=x) = P(b=x|a_i=y) + (P_{max} - P_{min}) \cdot W_{ai} \bigg/ \sum_{i=1}^{n} W_{ai} \quad (3)$$

Expressions (1), (2) and (3) provide $2^n$ of the $2^{n+1}$ required conditional probabilities which relate b with $a_1, a_2, a_3, \ldots, a_n$. If the conditional probabilities are set out in the manner of the Canonical form table above then the $2^n$ probabilities provided, correspond to the top row of values (i.e. $z_1$ to $z_{(2^n+1)}$). The remaining probabilities which correspond to the bottom row of values (i.e. $Z_{(2^n+1)}$ to $z_{(2^{n+1})}$) follow from:

$$P(b=y) = 1 - P(b=x) \quad (4)$$

which is due to the two states of b being mutually exclusive and exhaustive. By assuming qualitative influences as described above, the use of expressions (1) to (4) reduces the required number of values to quantify a binary Bayesian Belief Network from $2^{n+1}$ to 2 bounding probabilities plus n parent node weights. For instance, for the four node Bayesian Belief Network let $W_{a1}=6$, $W_{a2}=3$, $W_{a3}=1$, $P_{max}=0.9$ and $P_{min}=0.1$. Adopting the canonical form of probabilities in the table above and assuming a positive qualitative influence from $a_i=x$ to $b=x$ then for $i=1$ to n, (1) and (2) translate to:

$$P_{max} = P(b=x|X1=x, X2=x, X3=x)$$

$$P_{min} = P(b=x|X1=y, X2=y, X3=y)$$

$$\therefore z_1 = 0.9 \text{ and } z_{16} = 0.1$$

The remaining probabilities follow from expressions (3) and (4). These probabilities are given in the table below and examples calculations are now given:

| State of X1 | A | | | | B | | | |
|---|---|---|---|---|---|---|---|---|
| State of X2 | A | | B | | A | | B | |
| State of X3 | A | B | A | B | A | B | A | B |
| State A of Y1 | 0.90 | 0.82 | 0.66 | 0.58 | 0.42 | 0.34 | 0.18 | 0.10 |
| State B of Y1 | 0.10 | 0.18 | 0.34 | 0.42 | 0.58 | 0.66 | 0.82 | 0.90 |

$$z_2 = P(b=x|a_1=x, a_2=x, a_3=y) =$$

$$P(b=x|a_1=x, a_2=x, a_3=x) - (P_{max} - P_{min}) \times W_{a3} \bigg/ \sum_{i=1}^{3} W_{ai}$$

$$z_2 = 0.90 - (0.90 - 0.10) \times 1/(6+3+1) = 0.82$$

-continued $$z_3 = P(b = x \mid a_1 = x, a_2 = y, a_3 = x) =$$

$$P(b = x \mid a_1 = x, a_2 = x, a_3 = x) - (P_{max} - P_{min}) \times W_{a2} \Big/ \sum_{i=1}^{3} W_{ai}$$

$$z_3 = 0.90 - (0.90 - 0.10) \times 3/(6 + 3 + 1) = 0.66$$

$$z_4 = P(b = x \mid a_1 = x, a_2 = y, a_3 = y) =$$

$$P(b = x \mid a_1 = x, a_2 = y, a_3 = x) - (P_{max} - P_{min}) \times W_{a3} \Big/ \sum_{i=1}^{3} W_{ai}$$

$$z_4 = 0.66 - (0.90 - 0.10) \times 1/(6 + 3 + 1) = 0.58$$

The consistency of the conditional probabilities in the table above can easily be verified by confirming that the required qualitative inequalities described above are upheld. The linear weighted deterministic expression (3) directly proportions conditional probabilities according to the weights attributed to parent nodes and thus maintains qualitative consistency.

The deterministic expressions given in the preceding paragraphs can be used for the task of determining conditional probabilities, although a further reduction can be made to this task. The reduction can be made by assuming that model efficacy is totally without fault if all of its contributing phases are similarly, totally without fault. Conversely, if all phases are judged to be totally fault ridden then model efficacy is assumed to be the same. Based upon expressions (1) and (2) from the preceding paragraphs, these assumptions can be expressed as follows:

$$P(b=\text{faultless} \mid a_1, a_2, a_3, a_4, a_5, a_6, a_7=\text{faultless})=1$$

$$P(b=\text{faultless} \mid a_1, a_2, a_3, a_4, a_5, a_6, a_7=\text{faulty})=0$$

where
b=model efficacy
$a_1$=conceptualisation efficacy
$a_2$=mathematical modelling efficacy
$a_3$=discretisation efficacy
$a_4$=computerisation efficacy
$a_5$=parameterisation efficacy
$a_6$=numerical solution efficacy
$a_7$=results interpretation efficacy As a result of the assumptions, the values of $P_{max}$ and $P_{min}$ are no longer required for each model being assessed. Along with the prior probabilities described above, a model efficacy evaluation in this example requires at least numerical weights for each of the listed seven root nodes. The weights reflect the relative importance of the phases represented by these nodes to model efficacy; the common child node.

Thus, the quantification task for the proposed Bayesian Belief Network topology for reasoning about model efficacy can be minimised by:
The determination of prior probabilities assuming two states for all root nodes,
The determination of conditional probabilities for all non-root nodes by adopting the proposed deterministic expression described above, and
applying the optional simplification to probability determination.

As a result, at least two numerical values are normally required for each relevant phase of a model to conduct an efficacy evaluation:

1) expert judgement on the extent to which a phase is without fault (otherwise described as the efficacy of the phase), and
2) expert judgement on the relative importance of a phase to the model.

These judgements define the required prior and conditional probabilities to fully quantify the Bayesian Belief Network for reasoning about model efficacy. Although a Bayesian Belief Network quantification task may be minimised, this can be left to the discretion of the user of the approach to efficacy evaluation disclosed herein. Any deterministic expression should be treated as a means to generate first pass conditional probabilities and these should be manipulated to reflect domain understanding. For example, conditional probabilities could be manipulated to reflect the synergistic influence of two or more model phases on model efficacy. Furthermore, if domain understanding is sufficient, more than two states could be considered for the nodes that represent these phases. These nodes may be decomposed into further Bayesian Belief Networks composed of disparate factors (as illustrated in FIGS. 4A and 4B, for example). If such decompositions are performed, then the minimal quantification requirements discussed above may be generalised as follows:
expert judgement on the efficacy associated with all root nodes, and
expert judgement on the relative importance, to their common children, of all non-terminal nodes, which may or may not be root nodes.

The core of the proposed approach to efficacy evaluation is, as explained above, a Bayesian Belief Network. The remaining elements to the approach are optional means for reducing the influence of human subjectivity in efficacy evaluation.

Having selected experts to conduct a model efficacy evaluation, means exist to reduce the influence of biased judgements and to some extent, correct human fallibility. Structuring experts' tasks to make them less error-prone has been applied within the proposed approach to model efficacy evaluation by minimising the amount of information to be elicited. Another means is to encourage the experts to consider issues relevant to modelling phases, such as posing questions as set out in the table below:

| Model Phase | Questions for expert consideration |
| --- | --- |
| Conceptualisation | Have the model requirements been adequately extracted from the model's intended purpose? |
| | Does the definition of the modelled system completely capture the necessary requirements? |
| | Have all necessary entities been considered to the appropriate depth? |
| | Have all necessary events or sequence of events been considered? |
| | Have all necessary influences upon modelled entities been considered? |
| | Have all necessary relationships between modelled entities been considered? |
| Mathematical modelling | Has the impact of all assumptions and limitations been considered? |
| | Does the mathematical model completely capture the conceptual model? |
| | Are all boundary conditions, initial conditions and singularities adequately described? |
| Discretisation | Have the effect of interpolation intervals and both temporal and spatial step lengths been considered? |
| | Is the arithmetic representation of discontinuities and singularities appropriate? |
| Computerisation | Have all coding, compiling, linking and runtime environment errors been considered? |

| Model Phase | Questions for expert consideration |
| --- | --- |
| Parameterisation | Have reliable and authoritative data sources been used?<br>Have you considered age, accuracy of measurement, appropriateness, format and internal consistency of parameter data?<br>Have data transformations such as unit conversions, co-ordinate transformations and pre/post processing algorithms been considered?<br>Has the aggregated influence of parameter variability been statistically measured?<br>Is parameter data theoretical, experimental, or in situ operational data? |
| Numerical solution | Has the effect of model round-off procedures and numerical solution convergence tolerance settings been considered?<br>Was the experimental design appropriate? |
| Results interpretation | Has post-processing been conducted appropriately (e.g. interpolation and extrapolation)?<br>Are there limitations to the display of results? |

To counter the influence of bias in model efficacy evaluation, engineers may seek evidence relevant to the various phases of modeling. Assessing the efficacy of model conceptualisation is often reduced to logical and structured reasoning. In a military model for instance, when analysing "the impact of aspect dependence signature on target detection", a 6-Degree of Freedom (DoF) model of motion would automatically be chosen over a 3-DoF model. Engineers can specifically question whether the modelled physical entities and their functions, as well as the modelled environment and interactions within it, sufficiently meet requirements. To help in making an informed judgement about model conceptualisation, engineers should query the existence of and inspect relevant information. This includes the description and specification of the problem, formalisation of model requirements, and documented analysis that links the two.

During mathematical modelling, assumptions must frequently be made (e.g. modelling fluid dynamics using Bernoulli's equation assumes steady, inviscid and incompressible flow). In order to assess the appropriateness of a model assumption, engineers should question whether the effect of a counter-assumption would have any bearing on model results. As for conceptual modelling, cause-effect graphing may be used as evidence of the efficacy of mathematical modelling. Rules of thumb have been suggested for evaluating the efficacy of model computerisation. For instance, structured programming that is modular or object oriented has been proposed as an indicator of high quality. In assessing the efficacy of model parameterisation, engineers must consider the appropriateness and error-freeness of both embedded data and run-time or application-specific data. The use of high quality parameter data may be claimed if taken from reliable and authoritative data sources. The adequacy of the numerical solution of a computer model can be confirmed by manual calculation and by verification against a known analytical solution. Finally, however, the effectiveness with which model output is interpreted, is largely influenced by the skill of the model user.

Another means for reducing the influence of human subjectivity includes providing aids to judgement elicitation. The present inventor proposes that imprecision can be catered for simply by eliciting maximum and minimum probabilities, which bound the belief range of the expert. This allows the most optimistic and pessimistic inference results to be determined by stochastic simulation and would not require detailed knowledge of probability variation. Regardless of the imprecision with which beliefs are expressed, graphical tools can be used for belief elicitation. Such tools allow the visualisation of beliefs and include number lines or probability scales and probability wheels or manipulable pie charts and/or any other suitable graphical techniques.

Figure 5:
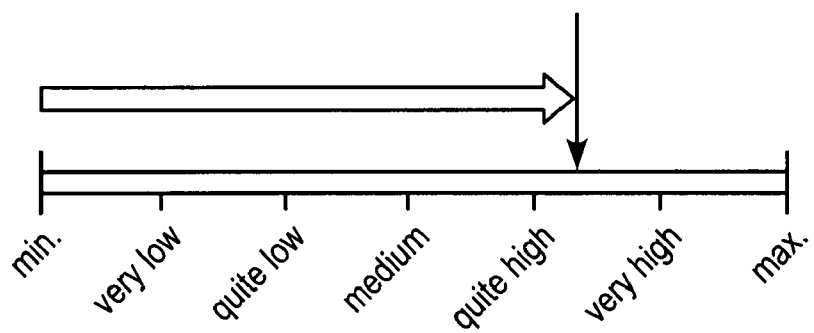
FIGS. 5 and 6 show examples of graphical devices that can be used to obtain probability indications from experts for use in the method.

Number lines or probability scales are continuous scales with either linear or log spaced values and end points that represent extreme values, as shown in FIG. 5. The probability scale can be labelled with numerical or non-numerical descriptors (e.g. the textual labels in the Figure) and experts can mark their response at or between any of the delineations on the scale. The probability scale requires little instruction in how to use it and expert responses are readily converted to numerical variables for analysis.

Figure 6:
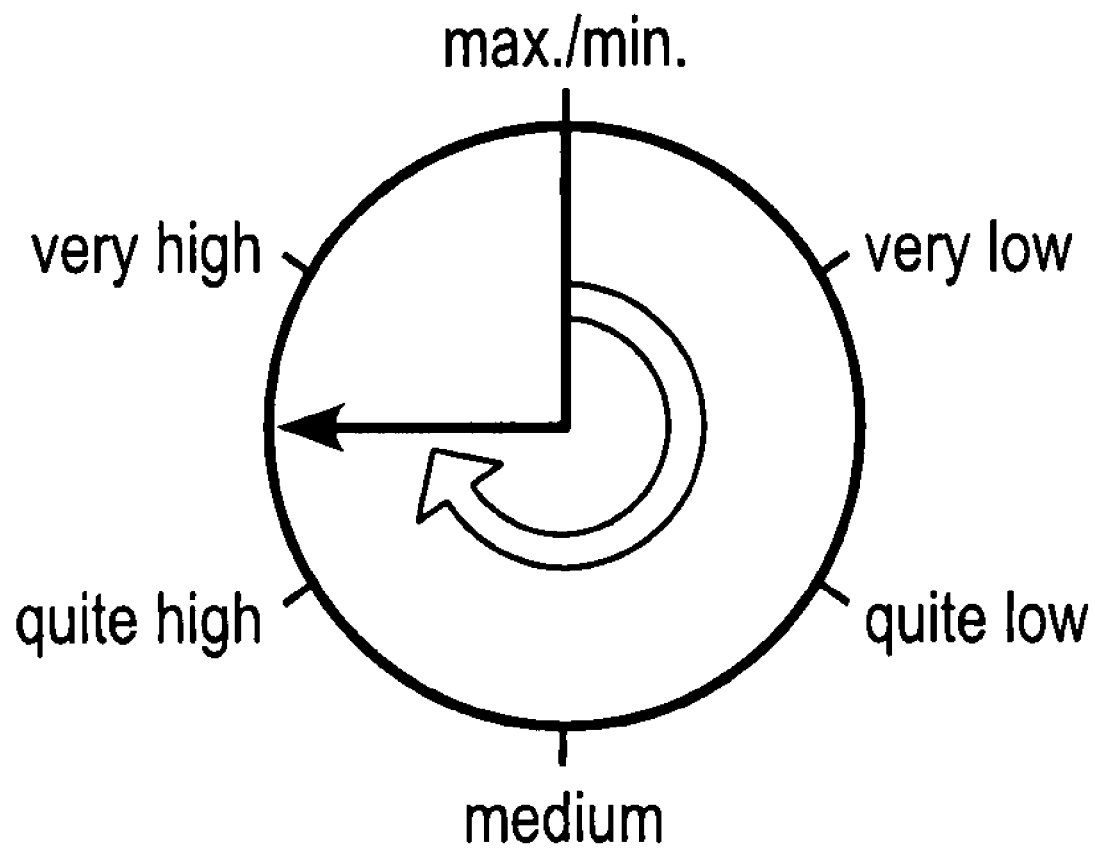

A probability wheel or manipulable pie chart that visualises discrete probability distributions as sectors of a circle is shown in FIG. 6. The areas of the pie sectors are proportional to required probabilities and the user can adjust the area of each sector, by manipulating sector edges to the required position.

Another means for reducing the influence of human subjectivity includes combining human judgements. A range of mathematical approaches for combining human judgements (provided by different experts) exist, e.g. linear and logarithmic opinion pools, Dempster combination and Fuzzy aggregation of weighted linguistic information.

Returning to the overview of FIG. 2, at step 208 Bayesian inference is conducted through the BBN and at step 210 an output representing the results of the BBN inference procedure is generated, which provides an indication of the overall efficacy of the model for evaluation.

For fuller understanding, an example of the application of the method will now be given. The Bayesian Belief Network approach to model efficacy evaluation was applied to a hierarchy of models belonging to the Air Systems Business Unit of BAE Systems, which cover various aspects of military aircraft; currently Eurofighter Typhoon, the F-35 Joint Strike Fighter, Hawk and Nimrod MRA4. Systems modelling is integral to the systems engineering that is undertaken to meet requirements of customers for these aircraft and is conducted at all levels of the systems hierarchy from the analysis of aircraft fleets to the analysis of component parts. The requirement considered in this example is survivability. Survivability can be considered to be the capability of a system to avoid or withstand a man-made hostile environment. Whilst operating in hostile environments, military systems must survive a variety of threats. The nature of these threats may be conventional, electronic, nuclear, biological, chemical, high power microwave, kinetic energy, directed energy and sabotage or terrorism. Systems survivability may be considered in terms of two distinct categories: susceptibility reduction and vulnerability reduction. The first category concerns minimising the likelihood, of a system being detected, acquired, tracked, engaged and hit by a hostile threat. The second category concerns minimising the likelihood of a system being rendered incapable of completing its combat mission, having been compromised by a threat.

A wide variety of aircraft design and operational features contribute to aircraft survivability, such as speed and altitude, fire/explosion protection, armour, etc. An efficacy evaluation was performed on a network of Air Systems' modelling tools concerned with aircraft electromagnetic properties. The properties of interest were radar cross section, lightning attachment and electromagnetic compatibility, and these are key considerations in aircraft survivability analysis.

The efficacy evaluation of the electromagnetics tool network was performed with the participation of experts. The raw data required to perform the efficacy evaluations of each tool was obtained during interviews with the present inventor and each of the experts separately in turn. The application of the efficacy evaluation approach to the tools of the electromagnetics network was performed according to the steps of the approach described herein. To begin, the appropriate Bayesian Belief Network topology for each tool was determined from the template given in FIG. 3. The topologies were determined by pruning the template network of irrelevant nodes.

Having established the Bayesian Belief Network topology for each tool, the networks were quantified assuming both binary root node states and a deterministic expression for conditional probabilities, as explained above. Thus, two judgements were required for each of the root nodes along with supporting justification. The judgements and supporting justification were elicited from the electromagnetics experts during their respective interviews. The responses were guided with the use of the questions, heuristics and metrics. To make best use of the time, the expert responses were captured in-situ by the present inventor using either the efficacy evaluation software or pen and paper, according to individual preferences. The resulting data was verified with each participating expert following the interviews. A detailed elicitation was performed for the physical optics tool of the electromagnetics network. The results of this elicitation are presented in the table below:

| Bayesian Belief Network node | Conceptual efficacy |
|---|---|
| Phase efficacy [0 to 1] | 0.65 |
| Phase importance [0 to 10] | 8.0 |

Argumentation
Permittivity and permeability assumed at a macroscopic level atomic variation not considered
No dissipation of scattered wave is assumed that is due to atmospheric conditions (i.e free space is assumed)
Monostatic RCS is assumed at significant aspects for particular application (e.g. forward aspect for ground based radar)
Radar frequency assumed at 10 ghz
No induced current assumed on shadowed part of the object but in reality there will be surface wave propagation/creep
Induced current is dependent on incident field only so no multiple reflections which is unsuitable for re-entrant parts of a/c e.g. intake ducts
Background radar reflection may be significant for low level flight

| Bayesian Belief Network node | Mathematical efficacy |
|---|---|
| Phase efficacy [0 to 1] | 0.80 |
| Phase importance [0 to 10] | 8.0 |

Argumentation
Maxwell's equations are a good representation but cannot be solved in realistic computational time
Maxwell's equations derived from experimental test
Illumination source assumed to be at infinity for RCS calculation but transmitter may not be far-field hence affecting detectability
Boundary conditions for dielectric material/non-isotropic/radar absorbent materials may not be accurate e.g. for dielectric material absorbed energy is assumed to be lost
Induced surface current is assumed to be that induced on an infinite flat plate tangential to the surface at the point of incidence and tips are not accounted for -continued

| Bayesian Belief Network node | Discretisation efficacy |
|---|---|
| Phase efficacy [0 to 1] | 0.7 |
| Phase importance [0 to 10] | 7.0 |

Argumentation
Isoparametric patches are a geometric approximation of the object surface, PO integral may be computed numerically so approx. or decompose patches into flat triangular patches which may be solved analytically but are a further approx. of the surface
Gaps may result between neighbouring patches

| Bayesian Belief Network node | Computerisation efficacy |
|---|---|
| Phase efficacy [0 to 1] | 0.9 |
| Phase importance [0 to 10] | 9.0 |

Argumentation
Structured development and a history of usage
Subroutine and unit testing performed in accordance with technical computing standards.
Comparisons made with theoretical results for canonical objects (e.g. cones, spheres)

| Bayesian Belief Network node | Parameter 1 efficacy |
|---|---|
| Phase efficacy [0 to 1] | 0.75 |
| Phase importance [0 to 10] | 7.0 |

Argumentation
Perfectly conducting materials may be assumed to reduce model complexity
Dielectric and RAM parameters vary in reality due to manufacturing (and latter deteriorates over time) and are not quoted with error bounds
Data is mainly experimental

| Bayesian Belief Network node | Parameter 2 efficacy |
|---|---|
| Phase efficacy [0 to 1] | Provided by CADfix |
| Phase importance [0 to 10] | 8.5 |

Argumentation
Geometrical representation does not account for build quality and battle damage i.e. perfect a/c design assumed. Geometrical data is more important than material characteristics.

| Bayesian Belief Network node | Solution efficacy |
|---|---|
| Phase efficacy [0 to 1] | 0.85 |
| Phase importance [0 to 10] | 9.0 |

Argumentation
Closed form solution performed over patches involving no iteration except in determining shadow boundary
Wavelength/3 pre-determined from experience as appropriate isoparametric patch dimension

| Bayesian Belief Network node | Interpretation efficacy |
|---|---|
| Phase efficacy [0 to 1] | 0.6 |
| Phase importance [0 to 10] | 7.0 |

Argumentation
A smoothing algorithm may be used to approximate highly oscillatory signature Having obtained the necessary data to quantity the Bayesian Belief Networks for the electromagnetic tools, the final step of the efficacy evaluation approach was to perform Bayesian inference throughout the networks. Commercially-available software, such as Netica™, was used to perform the necessary inference in the computer implementation of the efficacy evaluation approach. Efficacy evaluations were performed for the electromagnetic tools having entered the elicited node judgements to the bespoke interface of the approach software. Evaluations were obtained for each tool in order upward through the model network. This order of execution was required to ensure the availability of necessary evaluation data.

Figure 7:
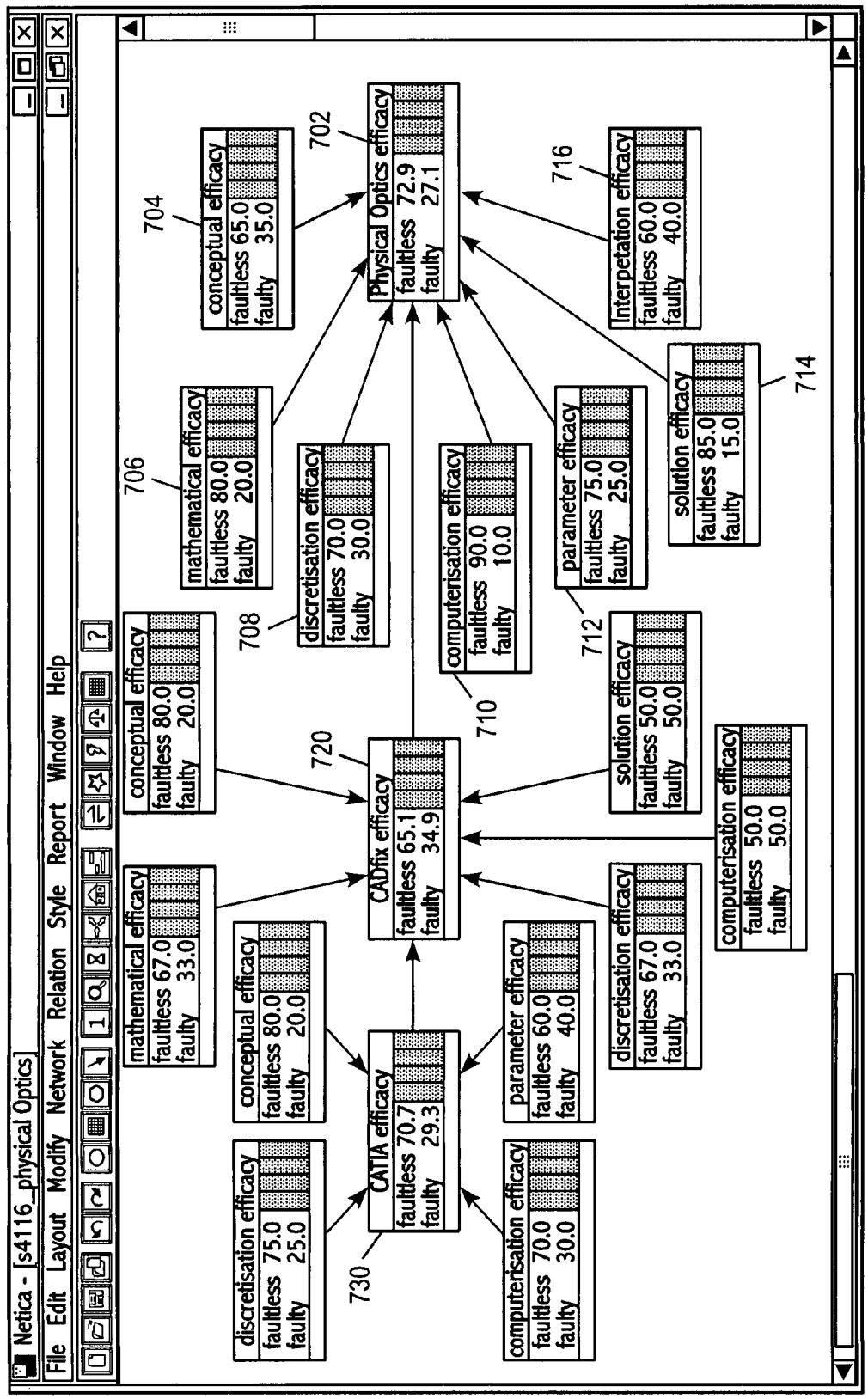
FIG. 7 is an example screen display of a Bayesian Belief Network produced by the method.

The evaluation of the Physical Optics tool (radar cross section prediction tool based upon Physical Optics and the equivalent edge current method) required an efficacy evaluation for the "CADfix" tool (a tool for correction of geometrical imperfections in CAD models and data preparation for export), which, in turn, required an efficacy evaluation for the "CATIA" tool, the Computer Aided Drawing software used for the representation of system physical geometry. Specifically, the Bayesian Belief Networks for the three tools were connected in Netica™ to represent the flow of data between the tools (i.e. from CATIA to CADfix to Physical Optics) and a screen shot of the resulting topology is shown in FIG. 7.

The root node 702 for the Physical Optics node is shown as having the following child nodes: conceptual efficacy 704, mathematical (modelling) efficacy 706, discretisation efficacy 708, computerisation efficacy 710, first parameterisation efficacy 712, (numerical) solution efficacy 714 and (results) interpretation efficacy 716. A further parameterisation child node for root node 702 comprises node 720, which is a root node representing the efficacy of the CADfix tool. That root node 720 also has child nodes representing its conceptual efficacy, mathematical modelling efficacy, discretisation efficacy, computerisation efficacy and solution efficacy, as well as a child node 730, which is a root node representing the efficacy of the CATIA tool. The CATIA root node has its own child nodes that represent its conceptual efficacy, discretisation efficacy, and parameter efficacy.

As opposed to the conventional ovals, Bayesian Belief Network nodes are commonly depicted in the Netica™ user interface as rectangles. The network of nodes required to perform an efficacy evaluation of the Physical Optics tool have been arranged in the Netica™ screenshot to be as discernible as possible in the screenshot. Efficacy evaluations for the three relevant tools (i.e. CATIA, CADfix and Physical Optics) may be observed from the numerical values for their respective nodes that appear roughly along the centre line of the depicted network. The numerical values for the remaining nodes represent the judgements elicited for the respective modelling phases of each tool and those for the Physical Optics tool can be found in the table above.

The efficacy evaluations can be obtained by performing probabilistic updating of the Bayesian Belief Networks, which resulted from applying the three steps of the evaluation approach as described above. Approximate updating can be performed using Netica™ or the like in a fraction of the time required for the manual calculation.

I claim:

1. A method of estimating overall efficacy of a mathematical model of system behaviour, the method including:
   providing a template representing factors that affect overall efficacy of a mathematical model of system behaviour;
   creating a Bayesian Belief Network (BBN) having nodes based on the factors of the template; and
   using the BBN to obtain an estimate of overall efficacy of the mathematical model of system behaviour,
   wherein each node of the BBN is allocated two states representing "faultless" and "faulty", and
   wherein numerical weights are attached to parent nodes of the BBN to represent relative significance to a state of a common child node of the parent nodes so that a linear weighted deterministic expression can be used to equate the weights to conditional probabilities associated with the child nodes.

2. The method according to claim 1, wherein the numerical weights are derived from expert judgments regarding relative importance of the factors represented by the parent nodes to model efficacy or any predecessor leaf nodes.

3. The method according to claim 2, wherein the linear weighted deterministic expression takes the form:

$$P(b = x \mid a_i = x) = P(b = x \mid a_i = y) + (P_{max} - P_{min}) \cdot W_{ai} \bigg/ \sum_{i=1}^{n} W_{ai}$$

where binary child node b with states x and y has n binary parent nodes $a_1, a_2, a_3, \ldots, a_n$, also with states x and y; weights $W_{a1}, W_{a2}, W_{a3}, \ldots, W_{an}$ ($W_{ai} \in +R$) are attached to the parent nodes representing their relative importance to the state of b, and $P_{max} \geq P_{min}$ which together bound a range of possible probabilities of b=x, such that the expression provides $2^n-2$ of $2^{n+1}$ required conditional probabilities which relate b with $a_1, a_2, a_3, \ldots, a_n$.

4. A method of estimating overall efficacy of a mathematical model of system behaviour, the method including:
   providing a template representing factors that affect overall efficacy of a mathematical model of system behaviour;
   creating a Bayesian Belief Network (BBN) having nodes based on the factors of the template;
   using the BBN to obtain an estimate of overall efficacy of the mathematical model of system behaviour; and
   decomposing a root node of the BBN into at least one further BBN having nodes representing contributing factors that affect efficacy of the root node.

5. The method according to claim 4, further comprising:
   quantifying the at least one further BBN and performing Bayesian inference on the quantified further BBN to obtain an estimate of the efficacy of the root node.

* * * * *